INVENTOR.
MINARD A. LEAVITT

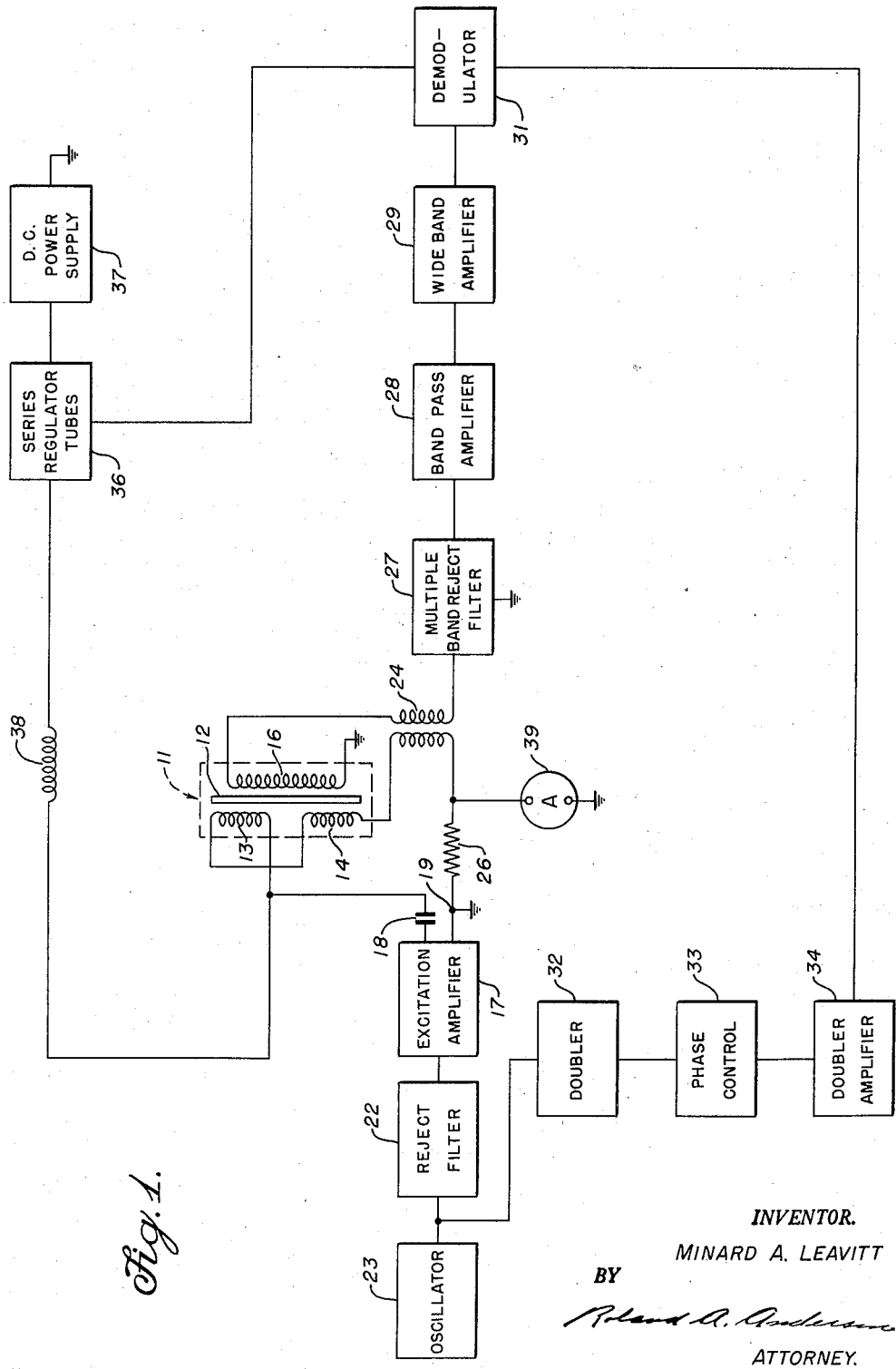

2,861,242

MAGNETOMETER

Minard A. Leavitt, Pleasant Hills, Calif., assignor to the United States of America as represented by the United States Atomic Energy Commission Application September 6, 1955, Serial No. 532,808

4 Claims. (Cl. 324—43)

The present invention relates to a magnetometer and more particularly to a device which accurately indicates the polarity and intensity of a magnetic field.

Many types of magnetometers are known in the art, but such devices are either limited to the higher ranges of magnetic field strength or are inaccurate in the lower ranges. To measure non-uniform magnetic fields in a confined volume with an accuracy of ±0.02 gauss in the range from 0 to 100 gauss with a search probe imposes certain restrictions; that is, perturbation of the displacement and measured field due to the presence of the probe must not seriously impair the accuracies of measurement, stability of the system must be sufficient to insure measurement within the required accuracy over long periods of time, and, if possible, the device should provide a continuous reading and be capable of driving a pen recorder or similar device.

The present invention comprises, in general, a probe having a small core of high magnetic permeability, low hysteresis magnetic material which is subjected to a sinusoidal magnetomotive force carrying just beyond the "knees" or magnetic saturation level of the B–H, flux density versus magnetic potential gradient curve for such material. The symmetry of the B–H curve results in a core flux consisting only of the applied frequency and odd harmonics thereof. If a steady magnetomotive force is simultaneously applied to the core, the symmetry of the B–H curve is destroyed and the resultant core flux includes even harmonics. The magnitude of each even harmonic component produced is almost linearly proportional to the magnitude of the displacement field over a wide range of field changes. A change in polarity of the displacement field causes a phase reversal of each even harmonic component. Thus, measurement of magnitude and phase of one of the even harmonic components of core flux provides a measure of magnitude and polarity of the displacement field. The application of the foregoing and the manner of overcoming the above-mentioned restrictions will be set forth in detail hereinafter.

It is therefore an object of the present invention to provide an improved magnetic field measuring means.

It is also an object of the present invention to provide a new and improved magnetometer probe.

Another object of the invention is to provide a magnetometer causing minimum perturbation of a magnetic field being surveyed.

A further object of the invention is to provide a magnetometer furnishing continuous readings and capable of driving a recording indicator or similar device.

It is another object of the invention to provide a magnetometer measuring both amplitude and polarity of a magnetic field.

Other objects and advantages of the invention will be apparent in the following description and claims considered together with the accompanying drawing, in which:

Figure 1 is a block diagram of a magnetometer circuit;

Figure 3:
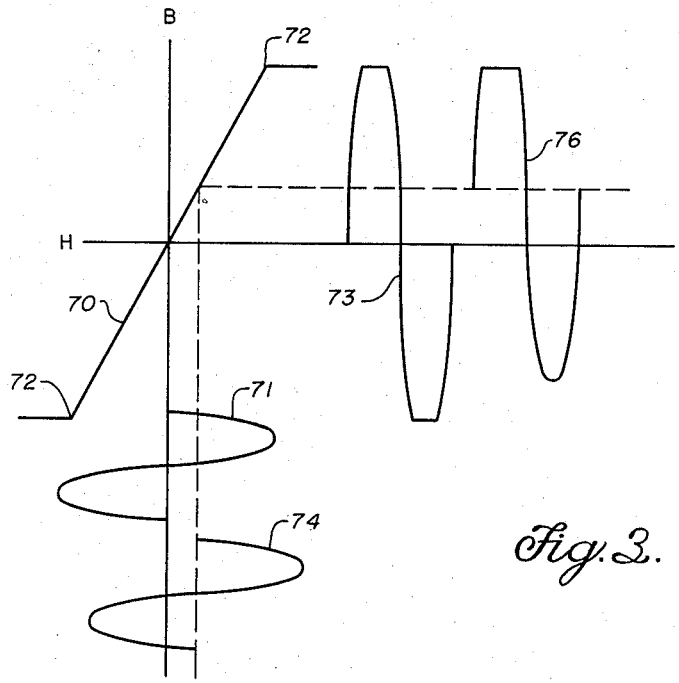
Figure 3 is a B–H curve indicating typical flux variations in the core of the device of Fig. 2.

Referring now to Fig. 1, there is provided a probe 11, the physical structure of which will be described in more detail hereinafter. Considering the electrical circuitry of the probe 11, there are wound about a high permeability, low hysteresis core 12 three coils 13, 14, 16. The first coil 13 and the second coil 14 are connected together in a series opposition manner. The third winding on the probe 11 is a radio-frequency pickup coil 16.

An excitation amplifier 17 is coupled to one side of the first coil 13 through a first direct current isolating capacitor 18. The low potential side of the excitation amplifier 17 is directly connected to a ground potential point 19. Input signals are coupled to the excitation amplifier 17 through a second harmonic reject filter 22 from a crystal controlled oscillator 23, in a typical instance operating at a frequency of 162.5 kilocycles. Thus only a sine wave at the oscillator fundamental frequency is applied by the excitation amplifier 17 to the first and second coils 13 and 14.

To complete the path for radio-frequency current available at the output of the excitation amplifier 17, power is coupled by the first capacitor 18 to one side of the first coil 13 as hereinbefore mentioned, from the second coil 14 through the primary winding of a balance transformer 24, and through a shunt 26 to the ground point 19. The pickup coil 16, one end of which is connected to ground, is connected in series with the secondary winding of the balance transformer 24. The primary to secondary coupling of the balance transformer 24 is generally adjusted so that the fundamental frequency component voltage induced in the pickup coil 16 is diminished by providing a cancelling voltage in the primary winding of the balance transformer 24.

The secondary winding of the balance coil 24 is connected to a multiple band reject filter 27 wherein any remaining fundamental and odd harmonic frequencies of the oscillator 23 produced in the probe 11 are rejected. A band-pass amplifier 28 is coupled to the output of the multiple band reject filter 27 and only the even harmonic components which may be produced in the probe 11 are applied to the band-pass amplifier. The output signal of the band-pass amplifier 28 is further amplified by a wide band amplifier 29 which amplifies the residual second harmonic voltage and applies the same to a demodulator 31. It is the purpose of the demodulator 31 to produce a direct current output signal responsive to the amplitude and phase of the second harmonic voltage induced in the pickup coil 16.

A standard or comparison signal must be furnished to the demodulator so that there is a voltage with which the second harmonic may be compared. A portion of the signal from the oscillator 23 is applied to a frequency doubler 32, the frequency doubler 32 output then having a frequency equal to the second harmonic of the oscillator 23. A phase control 33 maintains the phase of the doubled frequency so that after amplification by a doubler amplifier 34 the doubled frequency is applied to the demodulator 31 in proper phase relationship to the second harmonic frequency obtained from the probe 11.

From the demodulator 31 a control voltage is applied to a group of series regulator tubes 36 which regulate the amount of direct current supplied by a power supply 37. The controlled current is then coupled through an R. F. choke 38 to the first coil 13, the R. F. choke serving to prevent R. F. power from the excitation amplifier 17 from entering the circuitry associated with the series regulator tubes 36. The direct current then passes through substantially the same path as the R. F. output of the excitation amplifier 17, flowing in series through the first and second coils 13, 14, the primary winding of the balance transformer 24, and through the shunt 26 to the ground potential point 19. An ammeter 39 is connected in parallel with the shunt 26 to measure the quantity of direct current passing through the first and second coils 13, 14.

Figure 2:
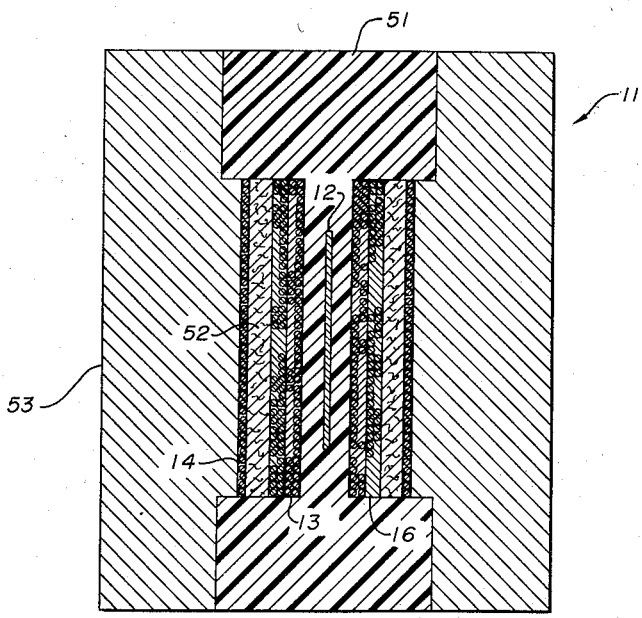
Figure 2 is a sectional view of the magnetometer probe of Fig. 1.

Referring now to Fig. 2, there is shown a cross-sectional view of the probe 11. Embedded centrally within a non-magnetic coil form 51 is the thin, elongated, low hysteresis, high permeability core 12. Progressing outwardly from the coil form 51 there is first wound the first coil 13, immediately over which there is wound the pickup coil 16, the two coils being separated only by necessary insulating material.

A layer 52 of spacer material is disposed about the pickup coil 16 for supporting the second coil 14 having one-half the number of turns of the first coil 13. The leads from the three coils are suitably arranged (not shown) so that the heretofore-mentioned connections may be conveniently made. The foregoing elements of the probe 11 are encased in a non-conducting and non-magnetic material 53 as a means for affording physical protection. The wires used in winding the first, second, and pickup coils 13, 14, and 16 preferably each have the same length. The thickness of the layer 52 (and thus the diameter of the second coil 14) is critically determined with respect to the diameter of the first coil 13, whereby the field strength is different for the first and second coils 13 and 14, but the total flux of both coils is substantially equal for equal values of current flow through the coils. In general, the dimensions are selected so that in a section taken transverse to the axis of the probe 11 the areas enclosed by the first coil 13 and the second coil 14 are related by the similarity:

$$\frac{\text{Area in coil 13}}{\text{Area in coil 14}} = \frac{\text{Ampere turns of coil 14}}{\text{Ampere turns of coil 13}}$$

The first and second coils 13, 14 are connected in series opposition so that the flux of one coil will cancel that of the other at distances from the coil comparable with two to three times the difference in radii of the coils. Perturbations of the magnetic field to be measured due to the presence of the probe 11 are consequently largely avoided. Within the probe two opposing fields are created, each having approximately equal amounts of total flux. For example, in the core 12 there may be created a field having an upward direction while in the area between the first and second coils 13, 14 there is an equal quantity of flux having a downward direction. Thus the core 12 is in a strong magnetic field while the area outside the probe 11 is generally unaffected by the magnetic fields created within the probe 11.

Referring now to Fig. 3, there is shown an idealized hysteresis loop 70 with curves indicating the magnetic flux changes occurring within the core 12. First indicating the condition where the exciting current varies symmetrically about the flux axis, there is shown a symmetrical current waveform 71. The amplitude of the symmetrical current waveform 71 is adjusted to extend just beyond the "knees" 72 of the hysteresis loop 70. Thus the symmetrical output voltage waveform 73, as induced in the pickup coil 16, contains elements of the applied frequency and odd harmonics thereof only.

In the instance where there is a constant magnetic field present, the input waveform is shifted along the horizontal or H axis. A biased current waveform 74 then produces a non-symmetrical output waveform 76 with respect to the hysteresis loop and now extends further past one "knee" 72 than the other. The output waveform 76 contains the fundamental frequency plus both odd and even harmonics. It should be noted then that a steady state magnetic field causes the production of a second harmonic frequency, the amplitude of the second harmonic varying according to the magnitude of the magnitude of the magnetic field and the phase depending on the polarity of the magnetic field.

By reference again to Fig. 1, it is seen that of the frequency components induced in the pickup coil 16, only the second harmonic caused by the presence of an external magnetic field is amplified and applied to the demodulator 31. There is also a standard signal of the second harmonic frequency applied to the demodulator 31 from the doubler amplifier 34, thus providing a means for comparison and determination of both phase and magnitude of the second harmonic component induced in the pickup coil 16. The result of such comparison and determination manifests itself in a direct current control signal which is applied to the series regulator tubes 36 by the demodulator 31.

The circuitry is so arranged that the amplitude of direct current passed by the series regulator tubes 36, and thence through the first and second coils 13, 14, is held at a value so that the second harmonic component induced into the pickup coil 16 is nulled. Although flux due to direct current passing through first and second coils 13, 14 is always cancelled at points beyond the immediate vicinity of the probe 11, within the probe 11 there is present a steady state magnetic field as a result of such direct current. Thus it is that the presence of an external field at the probe 11 may be cancelled by the passage of direct current of appropriate magnitude and polarity through the first and second coils 13, 14. A measurement by the ammeter 39 of the amplitude of direct current required to effect cancellation of such external field then gives an indication of the magnitude of the external field.

For example, suppose there is no external magnetic field, then there would be no direct current passing through the first and second coils 13, 14 to set up a counteracting field and the ammeter 39 would register zero. As a second example, assume an external field of 30 gauss, then direct current sufficient to set up a counter 30 gauss field within the probe 11 would be provided, causing the second harmonic voltage to decrease to a null. A reading taken from a suitable calibrated scale on the ammeter 11 would indicate the magnitude of the external field by measuring the current necessary to counterbalance the external field. Basically the system is a proportional feedback regulator capable of regulating the field to zero in the area where the core 12 is located.

The inclusion of the balance transformer 24 is optional. Its purpose may be considered as balancing out the air coupling between the coils in the probe 11, leaving only the harmonic producing magnetic coupling of the core 12. However, an efficient multiple band reject filter 27 accomplishes a similar effect.

The ammeter 11 may be replaced by some sort of recording meter so that a continuous record of a changing field might be maintained.

The instrument is sensitive only to that portion of a magnetic field which is parallel to the core 12, thus an accurate determination of the direction of a magnetic field is obtained. Generally, when taking a measurement the probe must be oriented with respect to the polarity of a magnetic field so that the D. C. power supply 37 is capable of supplying bias current in the direction required to null the second harmonic, since it is easier to build a power supply where the output current flows in one direction only. However, embodiments of the invention have been constructed which will supply current in either direction, thereby allowing measurement of any magnetic field without being required to reorient the probe.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. In a magnetometer probe, the combination comprising a magnetic core, a first coil wound about said core, a second coil disposed coaxially over said first coil, and a pickup winding disposed about said core between said first and second coils, the transverse sectional areas enclosed by said first coil and said second coil related by the similarity $$\frac{\text{Area in first coil}}{\text{Area in second coil}} \simeq \frac{\text{Ampere turns of second coil}}{\text{Ampere turns of first coil}}$$

2. The combination of claim 1 wherein the wire of each of said first coil, second winding, and pickup winding is substantially of equal length.

3. In apparatus for determining the magnitude of a magnetic field, the combination comprising a magnetic core, a first coil disposed coaxially about said core, a pickup coil disposed coaxially about said first coil, a second coil disposed coaxially about said pickup coil and having a diameter substantially exceeding that of said first coil, said first coil and said second coil being connected in series opposition, said second coil producing a quantity of flux generally canceling in the area outside said second coil the flux produced by said first coil, an oscillator coupled to said first coil and said second coil and providing alternating current therefor, a regulated current source having an output coupled to said first coil and said second coil, a detector having an input coupled to said pickup coil, said detector being sensitive only to even harmonics of the frequency at which said oscillator operates, the output of said detector coupled to said regulated current source whereby said even harmonics are reduced to a null by the magnetic field in said core created by said regulated current source output, and means measuring the magnitude of said regulated current source output.

4. In a magnetometer probe, the combination comprising a magnetic core with high magnetic permeability and low hysteresis, a body of non-magnetic material incasing said core, a first coil disposed coaxially about said core, a second coil disposed concentrically about said first coil and having a diameter greater than said first coil and having a wire length approximately equal to the wire length of said first coil, said first coil and said second coil being connected in series opposition whereby magnetic fields thereof are canceled outside said probe, the ends of said core being confined within the area enclosed by said coils, and an outer non-magnetic shield surrounding said coils.

References Cited in the file of this patent

UNITED STATES PATENTS

| | | |
|---|---|---|
| 2,406,870 | Vacquier | Sept. 3, 1946 |
| 2,418,553 | Irwin | Apr. 8, 1947 |
| 2,502,626 | Mages | Apr. 4, 1950 |
| 2,549,567 | Berman | Apr. 17, 1951 |
| 2,570,870 | Schmitt et al. | Oct. 9, 1951 |
| 2,660,704 | Harmon et al. | Nov. 24, 1953 |
| 2,677,802 | Irwin | May 4, 1954 |
| 2,713,661 | Schmitt | July 19, 1955 |